United States Patent
Kumar

(10) Patent No.: US 10,587,694 B1
(45) Date of Patent: Mar. 10, 2020

(54) APPLICATION AWARE COPY DATA MANAGEMENT OF APPS DEPLOYED IN PUBLIC CLOUD ENVIRONMENTS

(71) Applicant: EMC IP Holding Company LLC, Hopkinton, MA (US)

(72) Inventor: Sunil Kumar, Kadugodi (IN)

(73) Assignee: EMC IP HOLDING COMPANY, Hopkinton, MA (US)

(*) Notice: Subject to any disclaimer, the term of this patent is extended or adjusted under 35 U.S.C. 154(b) by 28 days.

(21) Appl. No.: 15/655,151

(22) Filed: Jul. 20, 2017

(51) Int. Cl.
H04L 29/08 (2006.01)
G06F 16/27 (2019.01)
G06F 16/178 (2019.01)

(52) U.S. Cl.
CPC .......... H04L 67/14 (2013.01); H04L 67/1095 (2013.01); *G06F 16/178* (2019.01); *G06F 16/27* (2019.01); *H04L 67/16* (2013.01)

(58) Field of Classification Search
CPC ..... H04L 67/14; H04L 67/1095; H04L 67/16; G06F 17/30174; G06F 17/30575
See application file for complete search history.

(56) References Cited

U.S. PATENT DOCUMENTS

| | | | |
|---|---|---|---|
| 8,706,700 B1* | 4/2014 | Natanzon | G06F 16/128 707/687 |
| 9,262,146 B1* | 2/2016 | Gupta | G06F 8/65 |
| 2008/0028009 A1* | 1/2008 | Ngo | G06F 11/2097 |
| 2010/0011178 A1* | 1/2010 | Feathergill | G06F 11/1466 711/162 |
| 2013/0036091 A1* | 2/2013 | Provenzano | G06F 17/30162 707/624 |
| 2013/0159646 A1* | 6/2013 | Atzmon | G06F 11/1451 711/162 |
| 2013/0339643 A1* | 12/2013 | Tekade | G06F 17/30581 711/162 |
| 2015/0032980 A1* | 1/2015 | Winokur | G06F 3/0665 711/162 |
| 2015/0370652 A1* | 12/2015 | He | G06F 11/1451 714/19 |

* cited by examiner

*Primary Examiner* — Tasnima Matin
(74) *Attorney, Agent, or Firm* — Workman Nydegger

(57) ABSTRACT

One example method includes discovering an application instance on a host, reporting the existence of the application instance, discovering application components of the application instance, and mapping the application components to information concerning an underlying filesystem and information concerning an underlying physical drive. The example method additionally includes freezing the application instance in response to a first instruction, and then thawing the application instance in response to a second instruction.

20 Claims, 2 Drawing Sheets

APPLICATION AWARE COPY DATA MANAGEMENT OF APPS DEPLOYED IN PUBLIC CLOUD ENVIRONMENTS

FIELD OF THE INVENTION

Embodiments of the present invention generally relate to copy data management. More particularly, at least some embodiments of the invention relate to systems, hardware, software, computer-readable media, and methods directed to copy data management of applications deployed in public cloud data storage and/or data protection environments.

BACKGROUND

With the increasing popularity of public clouds as a data storage platform or data protection environment, enterprises have started looking at public clouds as a possible deployment platform not only for data protection but also for enterprise-class applications, such as databases and email applications. In this regard, it is often the case that an enterprise needs several copies of such enterprise applications, where each copy may relate to a different use case of the enterprise. For example, such use cases may include backup, archiving, Governance-Risk-Compliance (GRC) preservation, testing and development, and analytics.

While various approaches have been devised for managing the various instances of enterprise-class applications in private datacenters and storage environments, those approaches are not available and/or are inapplicable for use in public cloud environments. Accordingly, it would be useful to provide copy data management of applications that are deployed in public cloud data storage and/or data protection environments.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
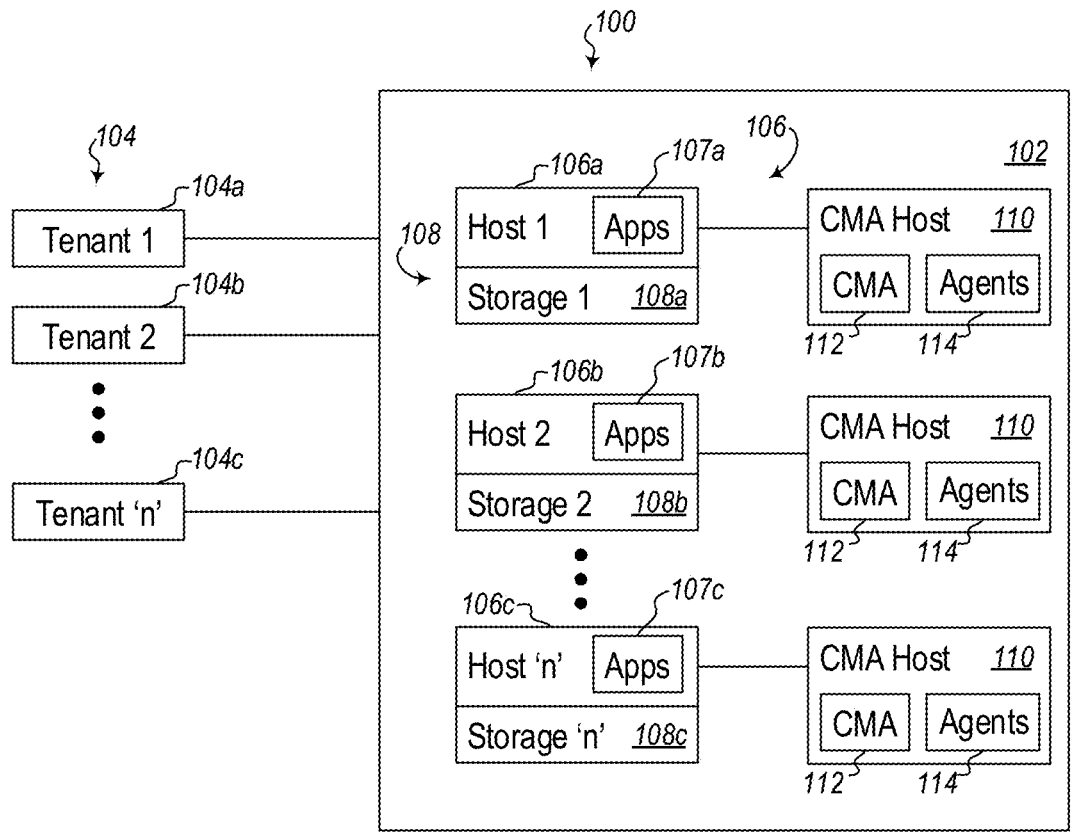
FIG. 1 discloses aspects of an example operating environment for at least some embodiments.

Embodiments of the present invention generally relate to copy data management. More particularly, at least some embodiments of the invention relate to systems, hardware, software, computer-readable media, and methods directed to copy data management of applications deployed in public cloud data storage and/or protection environments.

At least some embodiments of the invention implement an approach where application awareness and elastic block storage snapshot functionality and/or other functionalities are combined to provide application consistent copy data management capabilities to public cloud customers who have deployed their enterprise class applications running on top of an elastic block storage system. Some particular examples of enterprise class applications in connection with which embodiments of the invention can be employed include, but are not limited to, SQL Db, Oracle Db, and MS Exchange including MS Exchange mailboxes. Additional, or alternative, enterprise class applications can also be managed in connection with embodiments of the invention. As well, copies of the enterprise class applications can be managed for their entire lifecycle, including creation, modification, deletion, and expiry.

In some specific example embodiments of the invention, at least some functionality may be provided by a platform such as the EMC AppSync platform, although use of this particular platform is provided only by way of illustration and is not required. As well, other functionality can be provided by way of the Amazon Web Services (AWS) Elastic Block Storage (EBS) platform although, again, use of this particular platform is provided only by way of illustration and is not required.

In one example implementation, a copy management application (CMA) is deployed on a cloud storage system server that is associated with a tenant, or customer, of the cloud storage system. The customer can use the CMA to push application-aware agents (AAA), or simply, agent, to one or more of the hosts running the customer applications in the cloud storage system. Each instance of the agent discovers all instances of one or more applications running on the host to which the agent was pushed, and information such as the name, host location, and number of instances of each application is reported by the agent to the CMA.

In order to perform the application instance discovery process, the agents include code and logic that is operable to detect installation of a particular application on a host, for example, an Oracle or SQL server installation. The discovery process may be performed by a variety of different processes including, but not limited to, checking a Windows registry for the application instance, identifying application configuration files at a specific location associated with the host, and/or querying a list of processes running at the host to determine if an instance of the application is running.

With the information provided by the agent, the CMA can associate the discovered applications to one or more service plans, that can each take the form of an object that defines and stores attributes and service level agreements (SLA) of the copies that will be created for the discovered applications. The service plan can be an executable item that may be run by the CMA. Example copy attributes that can be specified in a service plan may include copy creation schedules, copy type, and whether the copy will be a full copy or differential copy.

As part of execution of the service plan, the CMA sends a request to the agents to perform a deep discovery process for the application instances previously identified. In general, the deep discovery process can include discovery, for each application instance, of application components, and mapping of the application components to associated filesystem and physical drive information. The physical drives, in turn, can be mapped to cloud storage volumes, and this mapping information stored.

An agent is then used to freeze an application instance by putting the application instance in a backup mode, and a snapshot is then created for the mapped volumes. After the snapshot is created, the application instance is thawed by changing the mode of the application instance from backup to normal. Information concerning the application instance layout, and corresponding volumes and snapshots is then catalogued and, finally, the copy creation is marked as done. After copy creation is completed, the application copy can be employed in any needed use cases.

Embodiments of the invention may provide for a variety of advantages. For example, embodiments of the invention may facilitate orchestration between an application and underlying storage system and create an application consistent copy. As well, embodiments of the invention may provide for management and monitoring of multiple copies of an application across both primary storage and data protection storage. Other possible advantages of one or more embodiments of the invention will be apparent from this disclosure.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in a public cloud environment such as a cloud services environment that may be, or include, a data protection system operating environment that includes one or more storage systems or storage environments including primary storage and data protection storage. The storage environment may take the form of a cloud storage environment, an on-premises storage environment, and hybrid storage environments that include public and private elements, although the scope of the invention extends to any other type of storage environment as well. More generally, embodiments of the invention can be implemented in any suitable cloud services environment and the scope of the invention is not limited to the example environments disclosed herein. Any of these cloud environments can take the form of an operating environment that is partly, or completely, virtualized. One particular example of a cloud services environment in connection with which embodiments of the invention may be employed is the AWS environment.

The storage environment may include one or more host devices that each host one or more applications used by a tenant or customer of the storage environment. As such, a particular tenant may employ, or otherwise be associated with, one or more instances of each of one or more applications. In general, the applications are not limited to any particular functionality or type of functionality. Some example applications include email applications such as MS Exchange, database applications such as SQL Server, filesystems, and datastores. One example of an application that may be used to manage application copies, and in which the functionality disclosed herein can be employed, is EMC AppSync.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular reference now to FIG. 1, an example operating environment 100 may include a cloud services environment 102 accessible by one or more tenants 104, such as tenants 104a, 104b and 104c for example. In general, the tenants 104 communicate with the cloud services environment 102 to employ various services provided by the cloud services environment 102. For example, the tenants 104 may use the cloud services environment 102 for storage of data and applications, including copies of applications. Thus, the cloud services environment 102 implements a storage function, among others, that may be employed by one or more of the tenants 104.

As well, and shown in FIG. 1, the cloud services environment 102 may include a plurality of hosts 106, particularly hosts 106a, 106b and 106c. Each of the hosts may host one or more instances of one or more applications, such as applications 107a, 107b and 107c. The applications 107a-107c may include, for example, email applications such as MS Exchange, database applications such as SQL Server, filesystems, datastores, and additional or alternative applications. The scope of the invention is not limited to any particular type, number, or combination of applications.

One, some, or all, of the hosts 106 may take the form of a VM, although that is not required. In general, the VM is a virtualization of underlying hardware and/or software and, as such, one or more of the hosts 106 may include or otherwise be associated with various underlying components, such as storage 108, and particularly, storage 108a, 108b and 108c.

In some instances, the storage 108 can take the form of respective storage volumes for each of the hosts 106. Examples of such storage volumes can take the form of elastic block storage (EBS) volumes that store data at a block level, and may be created by way of applications such as the Amazon EBS platform. The storage volumes can be considered as elastic with respect to at least some of their attributes. To illustrate, attributes such as the capacity, performance, and type, of storage volume can be changed on the fly as tenant needs change. The storage volumes, which may be implemented as block level storage volumes, can be employed in any of a variety of ways. For example, a file system can be created on top of a storage volume, a database can be constructed using the storage volumes, and/or applications and data can be stored in the storage volume. In at least some embodiments, the storage volumes provide durable snapshot capabilities.

The storage volumes can employ, or be backed by, a mix of storage types, such as Solid State Drive (SSD) storage for transactional type workloads such as databases and boot volumes whose performance is typically considered in terms of the number of input/output operations (IOPS) performed. Additionally, or alternatively, the storage volumes can use Hard Disk Drive (HDD) storage for throughput intensive workloads that are typically measured in terms of data transfer rates such as MB/s.

With continued reference to FIG. 1, each of the application hosts 106 may host one or more instances of one or more applications used by the tenants 104. For example, a single application host 106 may host multiple instances of a database application used by one of the tenants 104. The application hosts 106 can use any suitable operating system, such as Windows or Linux, for example. Thus, in addition to implementing a storage function, the cloud services environment 102 also implements a hosting function for applications that may be employed by one or more of the tenants 104.

For each of the hosts 106, the example cloud services environment 102 includes a corresponding CMA host 110 that hosts one or more instances of a copy management application (CMA) 112, and includes one or more agents 114. As disclosed in more detail elsewhere herein, the CMA hosts 110 are able to communicate and cooperate with the tenants 104 and hosts 106 to implement various application copy management functions, and related functions. In other embodiments, the CMA application 112 can be deployed in a software as a service (SAAS) configuration to which the tenants 104 can subscribe. More generally, the scope of the invention is not limited to any particular CMA 112 deployment configuration. Finally, while disclosed in FIG. 2 as being similar to each other, the CMA hosts 110 need not be the same as each other, and can be configured differently from each other in alternative embodiments.

B. Example Host Configuration

Figure 2:
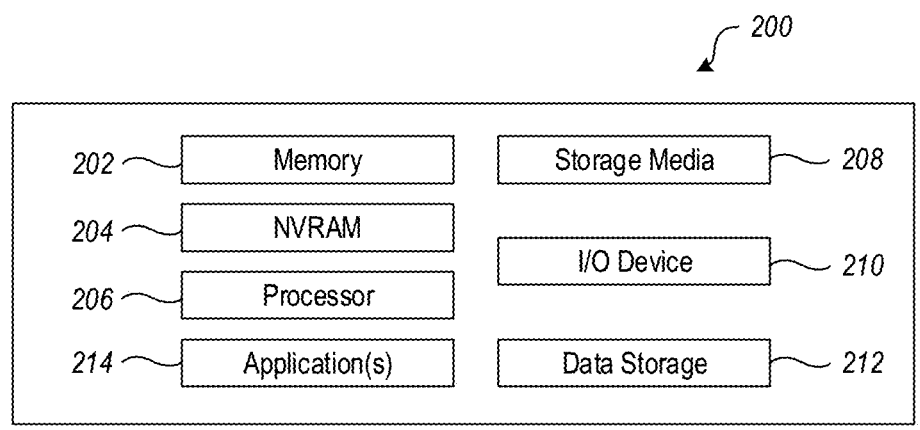
FIG. 2 discloses aspects of an example physical computing device configuration.

Turning now to FIG. 2, one or more of the tenants 103, hosts 106, storage 108, and CMA host 110 can take the form of a physical computing device, one example of which is denoted at 200. As well, a virtual machine such as a host 106 in the form of a VM may constitute a virtualization of any combination of the physical components disclosed in FIG. 2. In the example of FIG. 2, the physical computing device 200 includes a memory 202 which can include one, some, or all, of random access memory (RAM), non-volatile random access memory (NVRAM) 204, read-only memory (ROM), and persistent memory, one or more hardware processors 206, non-transitory storage media 208, I/O device 210, and data storage 212. One or more of the memory components of the physical computing device can take the form of solid state device (SSD) storage. As well, one or more applications 214 are provided that comprise executable instructions. Such executable instructions can take various forms including, for example, a copy management application, applications such as may be managed by a copy management application, and an application-aware agent. Examples of such applications and agents are disclosed herein. Further details concerning these example applications and agents are disclosed elsewhere herein, including in the discussion of FIG. 3.

C. Aspects of Some Example Methods

Figure 3:
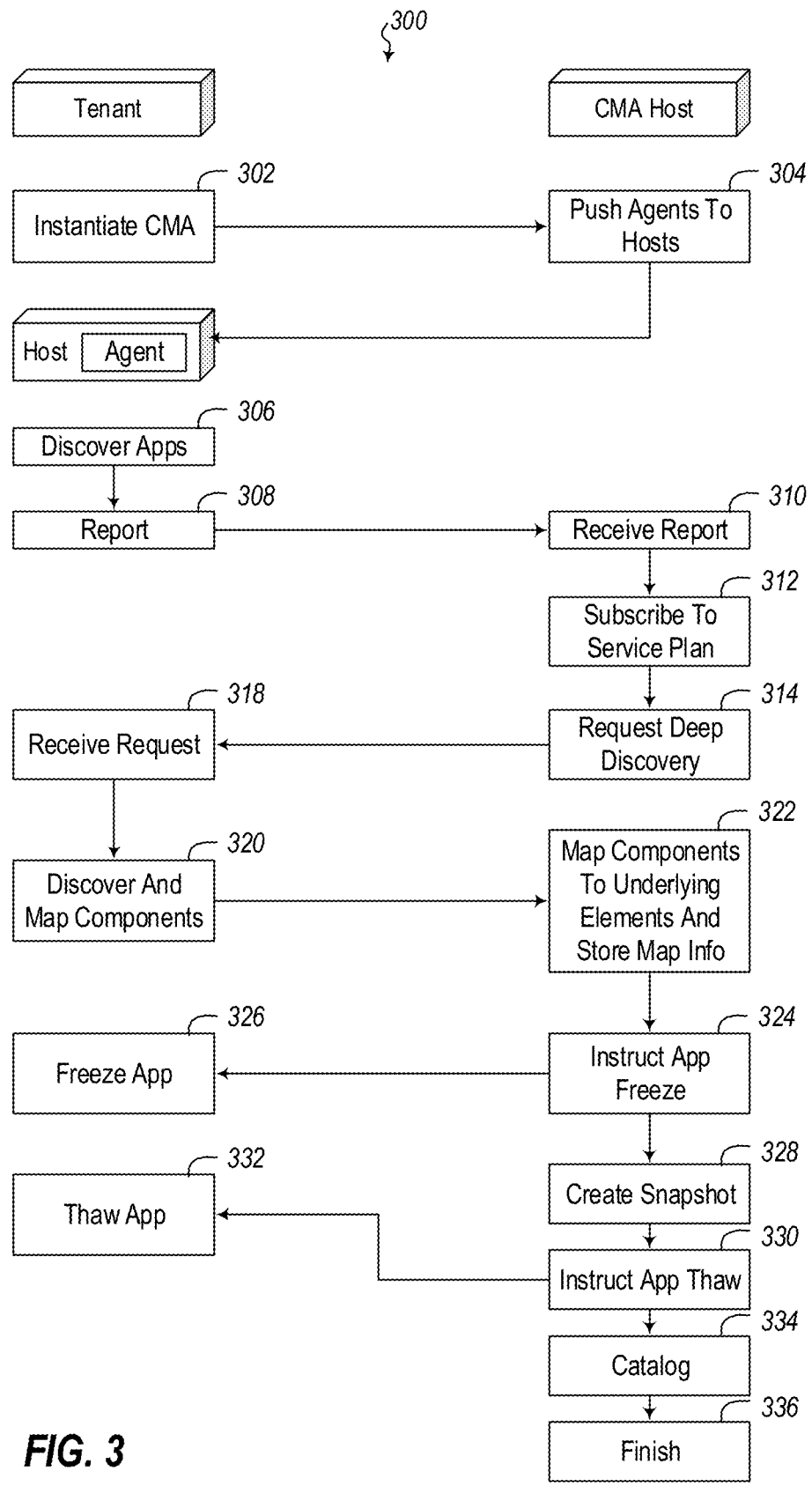
FIG. 3 discloses aspects of method for copy management of an application.

With reference now to FIG. 3, methods for application copy management are disclosed, where one particular embodiment of a method is denoted generally at 300. In some embodiments at least, the method 300 can be cooperatively performed, either in whole or in part, by a tenant, CMA host, an application host, and an agent.

The method 300 can begin when a tenant of a cloud services platform instantiates 302 a copy management application (CMA) that is hosted on a server of the cloud services platform. When the CMA has been instantiated, the CMA pushes 304 application-aware agents to one or more application hosts in the cloud services environment. Such agents may be configured to detect instances of one or more particular applications residing on an application host. Once resident on the application host, an agent may perform a variety of operations.

Initially, the agent may perform a process to discover 306 one, some, or all instances of one or more applications residing on the host to which the agent was pushed. After discovery 306 of instances of one or more applications at the host, the agent reports 308 to the CMA host, and the report is received 310 by the CMA host. Such a report 308 may include, for example, an identification of the specific applications discovered, and the number of instances of each application that was discovered.

At such time as the CMA becomes aware of the identity, number, and location of the various application instances, the CMA then subscribes 312 to a service plan for managing the application instances. The service plan may already exist in the system, or the CMA may have previously created the service plan. The service plan may be application specific and/or host specific in some instances, but in other instances, the service plan may embrace multiple different applications and/or multiple different hosts. More generally, the service plan can be customized to any set of circumstances or needs. Among other things, the service plan may specify application copy attributes such as, but not limited to, copy creation schedules, copy type, whether the copy will be a full copy or differential copy, and when a particular copy will expire, if at all. Any other attribute or attributes relating to application copy management may additionally, or alternatively, be specified in the service plan.

Once created 312, the service plan can be run by the CMA. Running the service plan may include requesting 314 one or more agents to perform a deep discovery process regarding one or more of the application instances previously identified 306 by the agent, or agents. This request from the CMA is received 318 by the host, or hosts, where the agent(s) reside. Additionally, or alternatively, the request can be received 318 directly by the agent itself. As part of the deep discovery process that has been requested 314 to be performed, the agent may discover 320 one, some, or all, components of one or more applications. In connection with the discovery process 320, the agent also maps the various application components to underlying filesystem information and physical drive information of the host where the agent resides. The application components may include, for example, database and log files.

The CMA then uses cloud services application program interfaces (API) to map 322 the physical drives of the host to volumes in the cloud services environment. This mapping information between host side physical drives and cloud services volumes can be persistently stored at the host and/or at the cloud services platform. In at least some embodiments, this mapping information is stored in a database which is locally attached to the CMA where the CMA stores information about applications and copies.

In some embodiments, the cloud services volumes may be AWS EBS volumes, although that is not required. In connection with the mapping process, the CMA may also query the cloud services platform to obtain information about the cloud services volumes. Such information may include, for example, information about cloud services volumes which are specific to a particular volume, such as volume-unique ID, availability zones, and/or other information. This information is used while creating copy/snapshot of these volumes, as discussed below.

Next, the CMA instructs 324 the agent at the host to freeze an application. The instruction is received by the agent, and the agent then freezes 326 the application identified by the CMA. Freezing the application involves changing the mode of the application, in this case, from normal mode to backup mode. In the backup mode, the application is prevented from running, and cannot be modified. Once the application is frozen, the agent notifies the CMA and the CMA then makes a copy of the application instance, that is, the CMA creates 328 a snapshot of the frozen application. Among other things, creation 328 of the snapshot includes creating a snapshot of all the mapped cloud services volumes that include the components of the frozen application and information about the frozen application. The snapshot can then be stored at the cloud services platform and/or at the tenant.

After creation 328 and storage of the snapshot, the CMA instructs 330 the agent at the host to thaw the application. The instruction is received by the agent, and the agent then thaws 332 the application identified by the CMA. Thawing the application involves changing the mode of the application, in this case, from backup mode to normal mode. In the normal mode, the application is able to run normally.

A cataloging process 334 is then performed to capture information about the snapshot, or copy, of the application instance. For example, cataloging 334 may include capturing information about the layout of the copy of the application instance, or application tree structure, that is, information about the structure of the application instance. Other information that may be cataloged includes information about the cloud services volumes where the snapshot is stored, and information about the snapshot itself. The cataloged information may be stored in a database in the cloud services environment and/or locally at a tenant.

Finally, the example process 300 finishes 336 when the CMA marks the copy creation as 'done.' The copy is now available for use in connection with one or more use cases, such as mounting, recovery, and/or unmounting of the application instance. More generally, the copy may be employed for any use case where a copy of the application is needed.

D. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   discovering all copies of an application running on a host;
   reporting the number of copies of the application that were discovered;
   discovering application components of one copy of the application;
   mapping the application components to a storage volume;
   freezing the one copy of the application in response to a first instruction;
   making a new copy of the application by copying the application components that are in the storage volume; and
   thawing the one copy of the application in response to a second instruction.

2. The method as recited in claim 1, further comprising running the new copy of the application.

3. The method as recited in claim 1, wherein the method is performed by an application-aware agent that has been pushed to the host.

4. The method as recited in claim 1, wherein the host is a virtual machine (VM).

5. The method as recited in claim 1, wherein existence of the copies of the application is reported to a copy management application.

6. The method as recited in claim 1, wherein the first instruction and the second instruction are received from a copy management application.

7. The method as recited in claim 1, wherein discovery of the application components of the one copy of the application is performed in response to a request from a copy management application.

8. A non-transitory storage medium having stored therein computer-executable instructions which, when executed by one or more hardware processors, perform operations comprising:
    discovering all copies of an application running on a host;
    reporting the number of copies of the application that were discovered;
    discovering application components of one copy of the application;
    mapping the application components to a storage volume;
    freezing the one copy of the application in response to a first instruction;
    making a new copy of the application by copying the application components that are in the storage volume; and
    thawing the one copy of the application in response to a second instruction.

9. The non-transitory storage medium as recited in claim 8, wherein the operations further comprise running the new copy of the application.

10. The non-transitory storage medium as recited in claim 8, wherein the operations are performed by an application-aware agent that has been pushed to the host.

11. The non-transitory storage medium as recited in claim 8, wherein the host is a virtual machine (VM).

12. The non-transitory storage medium as recited in claim 8, wherein existence of the copies of the application is reported to a copy management application.

13. The non-transitory storage medium as recited in claim 8, wherein the first instruction and the second instruction are received from a copy management application.

14. The non-transitory storage medium as recited in claim 8, wherein discovery of the application components of the one copy of the application is performed in response to a request from a copy management application.

15. A computing device comprising:
    one or more hardware processors; and
    the non-transitory storage medium as recited in claim 8.

16. A method, comprising:
    pushing an application-aware agent to a host;
    receiving, from the application-aware agent, a report identifying the number of copies of an application residing at the host;
    subscribing to a service plan that specifies parameters of a copy that is to be made of the application;
    requesting discovery of application components of one of the copies of the application that resides at the host;
    receiving a map of the application components to information concerning an underlying filesystem and information concerning an underlying physical drive;
    mapping a physical drive identified in the information concerning the underlying physical drive to a storage volume;
    sending an instruction to freeze the application;
    making a copy of the application; and
    sending an instruction to thaw the application.

17. The method as recited in claim 16, wherein the instructions to freeze and thaw the application are sent to the application-aware agent.

18. The method as recited in claim 16, wherein the application-aware agent is pushed to the host in response to a command from a tenant.

19. The method as recited in claim 16, wherein the map of the application components to information concerning an underlying filesystem and information concerning an underlying physical drive is received from the application-aware agent.

20. The method as recited in claim 16, further comprising cataloging information concerning the copy of the application, and marking copy creation as done.

* * * * *

UNITED STATES PATENT AND TRADEMARK OFFICE
CERTIFICATE OF CORRECTION

| | |
|---|---|
| PATENT NO. | : 10,587,694 B1 |
| APPLICATION NO. | : 15/655151 |
| DATED | : March 10, 2020 |
| INVENTOR(S) | : Sunil Kumar |

Page 1 of 1

It is certified that error appears in the above-identified patent and that said Letters Patent is hereby corrected as shown below:

On the Title Page

<u>Inventors</u>
Item (72), change "Kadugodi, IN" to –Sadarmangala, IN–

Signed and Sealed this
Twenty-sixth Day of May, 2020

Andrei Iancu
*Director of the United States Patent and Trademark Office*